United States Patent [19]
Turchetti

[11] Patent Number: 5,736,039
[45] Date of Patent: Apr. 7, 1998

[54] ELASTIC SUPPORT AND SHOCK ABSORBING DEVICE WITH A FILTER FILTERING SLEEVE

[76] Inventor: Attilio Turchetti, Via BR-060 Km. 213/233, 74431-970-Goiania/GO, Brazil

[21] Appl. No.: 258,515

[22] Filed: Jun. 10, 1994

[30] Foreign Application Priority Data

Jun. 11, 1993 [BR] Brazil .................... 9302413

[51] Int. Cl.[6] .................... B01D 33/80; B01D 35/00
[52] U.S. Cl. .................... 210/249; 55/492; 210/356; 210/391; 210/512.3
[58] Field of Search .................... 210/249, 250, 210/359, 360.1, 409, 411, 497.01, 512.1, 512.3, 354, 356, 380.1, 380.3, 780.391; 175/320, 323; 95/277; 55/492

[56] References Cited

U.S. PATENT DOCUMENTS

| | | | |
|---|---|---|---|
| Re. 9,724 | 5/1881 | Cole | 175/323 |
| 4,857,175 | 8/1989 | Spinnler | 210/512.3 |
| 5,128,033 | 7/1992 | Eberhardt | 210/512.3 |
| 5,156,735 | 10/1992 | Pecci | 210/497.01 |

*Primary Examiner*—Joseph W. Drodge
*Attorney, Agent, or Firm*—Herbert Dubno

[57] ABSTRACT

An elastic support is provided for a separating filter filtering sleeve. A tilting filter body (1) has one extremity with an inlet (2). A filter unit (3) is lodged inside the body (1). A rinsing device (4) for the filter unit (3) is provided at the top of the filter body (1). The lower portion of the body (1) is provided with an outlet (5) for filtrate. An outlet (6) for solids of the filtration process is also provided. The tilting filter body (1) is assembled on a frame (7) through linkages (8) and an inclination regulation device (9). The filtering unit (3) includes a filtering sleeve (10) operated in conjunction with an impeller (11). Sleeve (10) is assembled on the filter body (1) through supports (12). The supports (12) are elastic and are associated with a shock absorbing device (20).

18 Claims, 1 Drawing Sheet

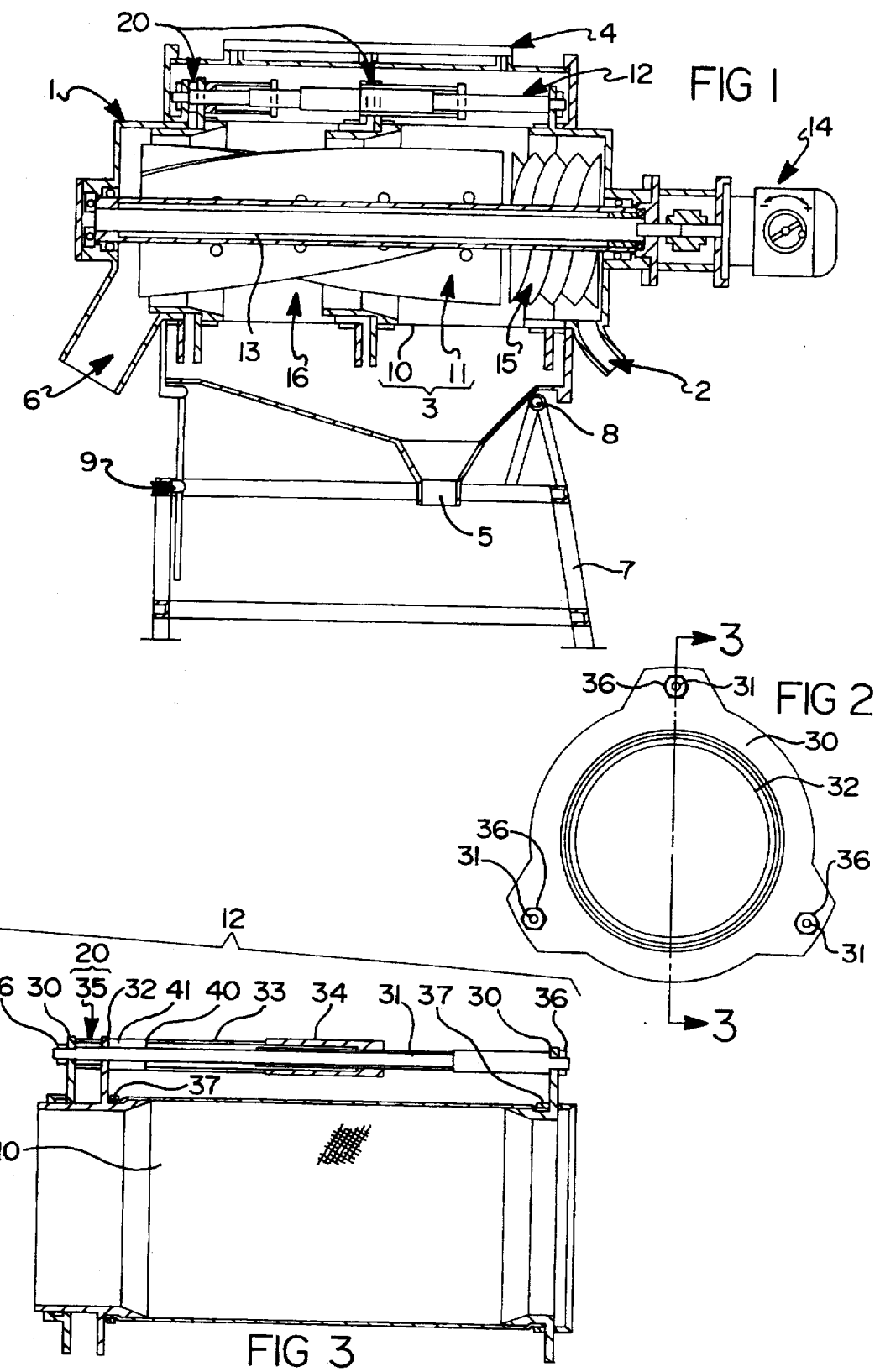

ELASTIC SUPPORT AND SHOCK ABSORBING DEVICE WITH A FILTER FILTERING SLEEVE

BACKGROUND OF THE INVENTION

1. Field of the Invention

The present invention relates generally to an improvement in the elastic support of a separating filter filtering sleeve. In particular, the present invention relates to an improvement which maintains the filtering sleeve, used in the separation of solid suspensions from fluids, stretched and allows the contraction of the filtering sleeve when undergoing radial stresses during the filtering process. The present invention provides shock absorbing during the automatic contraction and stretching of the sleeve by the elastic support.

2. Discussion of Relevant Art

A related separating filter is described in applicant's prior Brazilian Patent Application Serial Number PI9201898. Such related separating filter foresees an elastic support for the filtering sleeve, which is provided to maintain the filtering sleeve stretched and to allow its contraction when undergoing radial stresses during the filtering process.

The elastic support of the aforesaid prior patent application includes fixed extremity flanged rings which are assembled on the filter body and interconnected by rods which are regularly spaced apart. There is also included one or more fixed intermediate flanged rings provided in accordance with the length of the filtering sleeve. There is also provided axially movable flanged rings disposed adjacent to one of the fixed extremity flanged rings, and intermediate actually moveable flanged rings disposed adjacent to the respective fixed intermediate flange rings. The aforesaid moveable flanged rings are assembled slidably and movably on the rods.

One of the extremities of the filtering sleeve or its segments is assembled on a corresponding moveable flange extremity or intermediate ring. The other extremity of the filtering sleeve or sleeve segment is fixed to a corresponding fixed flanged extremity or intermediate ring or rings. The flanged extremity and intermediate rings are telescoping, with the extremities opposed to those receiving the sleeve or sleeve segment extremity, in the respective fixed flanged extremity or intermediate rings. The moveable flanged extremity and intermediate rings are arranged in a position stretching the respective filter sleeve or sleeve segments by means of springs, positioned around the corresponding rods, pressed between the moveable flanged extremity or intermediate rings and corresponding pressure adjusting nuts, threaded on threaded portions of the rods.

A problem with use of the aforementioned related elastic support arises from the fact that once the pressure of the fluid on the filtering sleeve ceases to exist, and due to the distension of the springs and return of the moveable flange rings to their initial position (whereby the sleeve is stretched), an impact is generated on the assembly. This impact propagates to the filtering sleeve and adversely affects the condition of the equipment and/or the filtering operation.

SUMMARY OF THE INVENTION

An object of the present invention is to solve the problem described hereinabove. The present invention accomplishes this by providing the elastic support with shock absorber elements, which include elastic elements acting against the spring distension force which acts on the moveable flanged rings supporting the corresponding extremities of the filtering sleeve.

Another object of the present invention is to solve the problem described hereinabove, and to substantially improve the filtering operation and assure the integrity of the filtering sleeve.

BRIEF DESCRIPTION OF THE DRAWINGS

FIG. 1 shows a schematic side view of a filter using an elastic support in accordance with a preferred embodiment of the present invention.

FIG. 2 shows the elastic support viewed from one of its extremities.

FIG. 3 illustrates a view taken along the line A—A shown on FIG. 2.

DESCRIPTION OF THE PREFERRED EMBODIMENTS

With reference to the accompanying drawings, there is shown a separating filter using an elastic support. As shown in FIG. 1, the separating filter is of the type which includes a tilting filter body 1, having an extremity provided with a feeder opening 2 for the product to be filtered. The tilting filter body 1 is provided internally with a filtering unit 3.

A rinsing device 4 is located on top of the tilting filter body 1. The filter body 1 is provided on its lower side with an outlet 5 for the filtrate.

At the extremity of the filter body 1 which is remote from the extremity having the feeder opening 2, there is provided an outlet 6 for the solids resulting from the filtering process. The tilting filter body 1 is supported on a frame 7 by means of linkages 8 which are disposed in the vicinity of the extremity having the inlet 2, and a tilting regulation device 9 provided at the solids outlet 6 extremity.

The filtering unit 3 is composed of a filtering screen sleeve 10 which operates in conjunction with an impeller 11. The sleeve-formed screen 10 is assembled on the filter body 1 by means of supports 12, with the inlet of the sleeve 10 being disposed close to the inlet 2 of the filter body 1. The blade portion of the impeller 11 is disposed internally of the filter sleeve 10. The other extremity of the filtering sleeve 10 is located close to the solid outlet 6 of the filter body 1.

The impeller 11 includes a shaft 13 which is coupled to a motor assembly 14 disposed outside the filter body 1. The radial blades of the turbine 11 are disposed around the shaft 13 to define the following impeller stages: an input stage 15 which is located close to the inlet 2 of the filter body 1 and the sleeve 10, and a processing stage 16 which is located inside sleeve 10.

The present improvements comprise providing a set of supports 12 for the filtering sleeves 10, wherein such supports 12 are elastic and are operably connected to a shock absorber device 20. This arrangement has the capability of maintaining the filtering sleeve 10 stretched during filtering; allowing for radial contraction of the filtering sleeve 10 under larger than normal radial stress during filtering; and providing shock absorbing at automatic contraction and re-stretching of the filtering sleeve 10 by the elastic supports 12.

Thus, the elastic support 12 with a shock absorbing device 20, when applied to a one-piece filter sleeve 10 as shown in FIG. 3, comprises fixed flanged extremity rings 30 assembled on the filter body 1 and interconnected by rods 31 which are regularly spaced between themselves. A movable ranged extremity ring 32 is disposed adjacent to one of the fixed flanged extremity rings 30, and is assembled slidingly and oscillatingly on the rods 31.

One of the extremities of the filtering sleeve 10 is assembled to the corresponding movable flanged extremity ring 32. The other extremity of the filtering sleeve 10 is assembled to the fixed flanged extremity ring 30, opposed to the movable flanged extremity ring 32. The movable flanged extremity ring 32 is telescopically removable relative to the fixed flanged extremity ring 30 adjacent thereto.

The movable flanged extremity ring 32 is positioned between pairs of elastic elements, preferably but not necessarily coil springs, assembled around the rods 31. One pair of such elastic elements may preferably, but not necessarily, comprise extension spring 33 forcing the movable flanged extremity ring 32 into a position where the filtering sleeve 10 is stretched and positioned under pressure between the movable flanged extremity ring 32 and a pressure regulating nut 34. The nut 34 is threadedly received on a threaded portion of the rod 31. The movable flanged extremity ring 32 is also forced into position by a shock absorbing spring 35 acting against the distension force of the extension spring 33 and positioned between the movable flanged extremity ring 32 and the fixed flanged extremity ring 30 adjacent to the same.

As a result, during the filtering operation and when the internal pressure of the filtering sleeve 10 maintains itself within normal standards, the filtering sleeve 10 is kept stretched by the movable flanged extremity ring 32, positioned where it stretches the sleeve, being in balance between the extension springs 33 and the shock absorbing springs 35, i.e., distended between the movable flanged extremity ring 32 and the pressure adjusting nuts 34, respectively, and the fixed extremity ring 30.

When a pressure increase within the filtering sleeve 10 occurs, resulting from the dynamics of the filtering process itself, and consequently a radial stress on the same, the filtering sleeve 10 contracts axially. This causes the movable flanged extremity ring 32 to move axially on the rods 31 and against the force of the extension springs 33, which are thus tensioned.

Once the overpressure within the filtering sleeve 10 has ceased, the extension springs 33 will extend and push the movable flanged extremity ring 32 into the initial position. This causes the filtering sleeve 10 to contract until returning to the stretched position. The return travel of the movable flanged extremity ring 32 is limited and smoothed by the shock absorbing springs 35. This avoids the impact after retensioning of the filtering sleeve 10 has ended, and balance has returned to the system.

The fixed flanged extremity rings 30 are secured to the rods 31 by means of nuts 36 applied to the external threads of rods 31. The extremities of the filtering sleeve 10 are fixed to the flanged rings by means of appropriate clamps 37. The nuts 34 are threaded on rods 31 to provide more or less pressure on the extension springs 34, according to the filtering operation to be performed.

Spacer bushings 40 and bushings 41 welded to the flanged ring may be positioned between the extremities of the extension springs 33 and the movable flanged extremity ring 32.

The present invention comprises embodiments wherein the elastic support 12 with the shock absorber 20 may also be applied to filtering sleeves 10 which are not formed of one-piece, i.e., of the type formed by modules coupled to each other as shown in FIG. 1. In FIG. 1 the filtering sleeve 10 is composed of two modules.

While the present invention has been shown described hereinabove with respect to certain preferred embodiments, it is to be understood that the invention is not limited thereto, but rather is susceptible of numerous changes and modifications which will occur to those skilled in the art. Consequently, the present invention is not to be limited to the details shown and described herein, but is intended to cover all such changes and modifications as are encompassed by the scope of the appended claims.

I claim:
1. A filtering apparatus, comprising:
   a filtering body provided with a filter unit;
   said filter unit including a flexible filtering sleeve and an impeller disposed within said filtering sleeve for forcing fluids radially outwardly against said filtering sleeve;
   said filtering sleeve being assembled on said filtering body by means of one or more supports;
   a shock absorbing device operably connected between said one or more supports and said filtering sleeve; and wherein
   said one or more supports are elastic and permit the filtering sleeve to expand and contract along a longitudinal axis thereof.
2. An apparatus according to claim 1, wherein said one or more supports and said shock absorbing device include:
   fixed flange extremity rings assembled on said filtering body and interconnected by rods which are spaced equally distantly apart; and
   an axially moveable flanged extremity ring positioned adjacent to one of said fixed flanged extremity rings and assembled slidingly and oscillatingly on said rods;
   one of the extremities of said filtering sleeve being assembled on said movable flanged extremity ting;
   the other extremity of said filtering sleeve being assembled on the fixed flanged extremity ring opposed to the moveable flanged extremity ring;
   said movable flanged extremity ring being telescopically movable relative to said fixed flanged extremity ring adjacent thereto;
   said movable flanged extremity ring positioned between pairs of elastic elements assembled around said rods;
   each said pair of elastic elements including an extension spring forcing the movable flanged extremity ring into position where said filtering sleeve is stretched and positioned under pressure between said movable flanged extremity ring and a pressure regulating nut threadedly received on a threaded portion of one said rod, and a shock absorbing spring acting against the distension force of said extension spring and positioned between said movable flanged extremity ring and said fixed flanged extremity ring adjacent thereto.
3. An apparatus according to claim 2, wherein:
   said filtering body comprises a tilting filtering body which is assembled on a frame by means of linkages and a tilting regulation device.
4. An apparatus according to claim 3, wherein:
   said impeller includes a shaft which is coupled to a motor assembly outside of said filtering body and around which radial blades are assembled.
5. An apparatus according to claim 4, wherein:
   said filtering body includes an inlet, a filter element rinsing device provided at the top portion thereof, and a filtrate outlet provided at the lower portion thereof;
   said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

6. An apparatus according to claim 3, wherein:

said filtering body includes an inlet, a filter element rinsing device provided at the top portion thereof, and a filtrate outlet provided at the lower portion thereof;

said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

7. An apparatus according to claim 2, wherein:

said impeller includes a shaft which is coupled to a motor assembly outside of said filtering body and around which radial blades are assembled.

8. An apparatus according to claim 7, wherein:

said filtering body includes an inlet, a filter element rinsing device provided at the top portion thereof, and a filtrate outlet provided at the lower portion thereof;

said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

9. An apparatus according to claim 2, wherein:

said filtering body includes an inlet, a filter element rinsing device provided at the top portion thereof, and a filtrate outlet provided at the lower portion thereof;

said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

10. An apparatus according to claim 1, wherein: said impeller includes a shaft which is coupled to a motor assembly outside of said filtering body and around which radial blades are assembled.

11. An apparatus according to claim 10, wherein:

said filtering body includes an inlet, a filter element rinsing device provided at the top portion thereof, and a filtrate outlet provided at the lower portion thereof;

said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

12. An apparatus according to claim 1, wherein:

said filtering body includes an inlet, a filter element rinsing device provided at the top portion thereof, and a filtrate outlet provided at the lower portion thereof;

said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

13. A filtering apparatus, comprising:

a filtering body provided with a filter unit;

said filter unit including a filtering sleeve and an impeller:

said filtering sleeve being assembled on said filtering body by mean of one or more supports;

a shock absorbing device operatively connected between said one or more supports and said filtering body; wherein said one or more supports are elastic; and said filtering body further comprises a tilting filtering body which is assembled on a frame by means of linkages and a tilting regulation device.

14. An apparatus according to claim 13, wherein:

said impeller includes a shaft which is coupled to a motor assembly outside of said filtering body and around which radial blades are assembled.

15. An apparatus according to claim 14, wherein:

said filtering body includes an inlet, a filter element rinsing device provided at the top portion thereof, and a filtrate outlet provided at the lower portion thereof;

said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

16. An apparatus according to claim 13, wherein:

said filtering body includes an inlet, a filter element rinsing device provided at the top portion thereof, and a filtrate outlet provided at the lower portion thereof;

said filtering body also being provided with an outlet for solids resulting from a filtering process;

said filter element being provided with an inlet close to said inlet of said filtering body;

said filtering sleeve being provided with an outlet close to said solids outlet of said filtering body; and said filtering sleeve being comprised of at least two modules.

17. A filtering apparatus, comprising:

a tilting filtering body having disposed therewithin a filter unit;

said filtering body being provided on its top with a filter unit rinsing device, and being provided on its lower portion with an outlet for filtrate from a filtering process;

said tilting filtering body being also provided with an outlet for solids from said filtering process, wherein said solids outlet is disposed on an extremity of said tilting filtering body which is opposed to an extremity of said tilting filtering body upon which said filtrate outlet is disposed;

said tilting filtering body being assembled on a frame by means of linkages and a tilting regulation device; wherein said filter unit includes a filtering sleeve and an impeller;

said filtering sleeve is assembled on said tilting filtering body by means of supports; and said filtering sleeve is provided with an inlet close to an inlet of said tilting filtering body;

said filtering sleeve being provided with an internal region lodging at least a portion of said impeller;

said filtering sleeve being provided with an outlet located close to said solids outlet of said tilting filtering body;

said impeller including a shaft which is coupled to a motor assembly outside said tilting filtering body and around which radial blades are assembled, defining an input stage located close to said inlets of said tilting filtering body and said filtering sleeve, and a processing stage located inside said filtering sleeve; and said supports comprising a set of supports for said filtering sleeve which are elastic and a shock absorbing device operatively associated with said set of supports.

18. An apparatus according to claim 17, wherein said elastic supports and said shock absorbing device include:

fixed flange extremity rings assembled on said filtering body and interconnected by rods regularly spaced between themselves; and an axially movable flanged extremity ring adjacent to one of said fixed flanged extremity rings assembled slidingly and oscillatingly on said rods;

one of the extremities of said filtering sleeve being assembled on said movable flange extremity ring, and the other extremity of said filtering sleeve being assembled on the fixed flange extremity ring opposed to the movable flanged extremity ring; wherein said movable flanged extremity ring is telescopically movable relative to the fixed flanged extremity ring adjacent thereto;

said movable flange extremity ring is positioned between pairs of elastic elements assembled around said rods;

each said pair of elastic elements including an extension spring forcing said movable flanged extremity ring into position where said filtering sleeve is stretched and positioned under pressure between said movable flanged extremity ring and a pressure regulating nut threaded on a threaded portion of one said rod, and a shock absorbing spring acting against the distension force of said extension spring in position between said movable flanged extremity ring and said fixed flanged extremity ring adjacent thereto.

* * * * *